US008689930B2

(12) United States Patent
Anderson et al.

(10) Patent No.: US 8,689,930 B2
(45) Date of Patent: Apr. 8, 2014

(54) SEISMIC VIBRATOR HAVING AIRWAVE SUPPRESSION

(75) Inventors: Colin George Anderson, Vossem (BE); Claudio Bagaini, Asker (NO); Emmanuel Coste, Oslo (NO); Martin Laycock, Asker (NO); Colin Readman, Dubai (AE)

(73) Assignee: WesternGeco L.L.C., Houston, TX (US)

( * ) Notice: Subject to any disclaimer, the term of this patent is extended or adjusted under 35 U.S.C. 154(b) by 23 days.

(21) Appl. No.: 13/434,631

(22) Filed: Mar. 29, 2012

(65) Prior Publication Data
US 2013/0256055 A1 Oct. 3, 2013

(51) Int. Cl.
*G01V 1/04* (2006.01)
*F16F 15/02* (2006.01)
*G01V 1/02* (2006.01)
*F16F 15/00* (2006.01)

(52) U.S. Cl.
USPC ........................................ 181/121; 181/401

(58) Field of Classification Search
USPC ......... 181/121, 114, 113, 208, 207, 108, 401; 367/189
See application file for complete search history.

(56) References Cited

U.S. PATENT DOCUMENTS

| | | | | |
|---|---|---|---|---|
| 3,160,549 A * | 12/1964 | Caldwell et al. | ........... | 428/317.3 |
| 3,648,828 A * | 3/1972 | McCaffrey et al. | ........... | 198/763 |
| 3,783,970 A * | 1/1974 | Danielson | .................... | 181/207 |
| 3,842,942 A * | 10/1974 | Jensen et al. | .................. | 181/207 |
| 3,856,107 A * | 12/1974 | Rabett | ........................... | 181/207 |
| 3,926,265 A * | 12/1975 | Bouyoucos | ..................... | 173/80 |
| 4,114,722 A | 9/1978 | Weber et al. | | |
| 4,628,490 A * | 12/1986 | Kramer et al. | .................... | 367/1 |
| 4,804,062 A * | 2/1989 | Airhart | ......................... | 181/121 |
| 4,848,512 A * | 7/1989 | Airhart | ......................... | 181/114 |
| 4,853,906 A * | 8/1989 | Cole | ............................ | 367/189 |
| 4,853,907 A * | 8/1989 | Bays | ............................ | 367/189 |
| 4,890,264 A | 12/1989 | Crews et al. | | |
| 4,922,473 A | 5/1990 | Sallas et al. | | |
| 4,930,113 A | 5/1990 | Sallas | | |
| 4,967,870 A * | 11/1990 | Airhart | ......................... | 181/121 |
| 5,000,285 A * | 3/1991 | Airhart | ......................... | 181/113 |
| 5,786,537 A * | 7/1998 | Anstey | ........................... | 73/662 |

(Continued)

FOREIGN PATENT DOCUMENTS

EP 0043669 1/1982

OTHER PUBLICATIONS

Press, et al., "Ground Roll Coupling to Atmospheric Compressional Waves", Geophysics, vol. 16, 1951, pp. 416-430.

(Continued)

*Primary Examiner* — Edgardo San Martin

(57) ABSTRACT

A seismic vibrator includes a baseplate having a surface configured to couple to a ground surface. A driver is coupled to the baseplate and is configured to move the baseplate in a vibratory manner. A decoupling system is coupled to a part of the baseplate other than the ground-contacting surface. The decoupling system includes a first layer having a Young's modulus greater than that of a second layer coupled to the first layer. The second layer is coupled to the baseplate. The Young's moduli, thicknesses and masses of the first and second layer are selected to provide the decoupling system with a resonant frequency of at most, a spatial aliasing frequency of seismic sensors deployed on the ground surface or a lowest seismic frequency of interest.

21 Claims, 2 Drawing Sheets

(56) References Cited

U.S. PATENT DOCUMENTS

| | | | |
|---|---|---|---|
| 6,381,544 B1 | 4/2002 | Sallas et al. | |
| 6,478,110 B1 * | 11/2002 | Eatwell et al. | 181/207 |
| 6,564,899 B1 * | 5/2003 | Arian et al. | 181/102 |
| 7,931,117 B2 * | 4/2011 | Payot et al. | 181/207 |
| 8,167,082 B2 * | 5/2012 | Eick et al. | 181/121 |
| 8,261,875 B2 * | 9/2012 | Eick et al. | 181/121 |
| 8,342,288 B2 * | 1/2013 | Eick et al. | 181/121 |
| 2011/0272206 A1 * | 11/2011 | Eick et al. | 181/112 |
| 2012/0048641 A1 * | 3/2012 | Eick et al. | 181/108 |

OTHER PUBLICATIONS

International Search Report and Written Opinion of PCT Application No. PCT/US2013/034507 dated Jul. 15, 2013: pp. 1-11.

\* cited by examiner

SEISMIC VIBRATOR HAVING AIRWAVE SUPPRESSION

BACKGROUND

The present disclosure is related generally to the field of vibrators used as seismic energy sources. More specifically, the present disclosure is related to vibrators having capability to suppress airwaves generated by the operation of such vibrators.

Seismic surveys for oil and gas exploration commonly use seismic vibrators to generate seismic energy that is transmitted into the Earth's subsurface. Airwaves (also often referred to as "airblast" or "air-coupled" waves, hereinafter "airwaves") are coherent noise trains produced by a surface seismic source, propagating at the speed of sound in air. Airwaves may be entirely coupled with the air, or they may be partially coupled with the near surface if the phase velocity of Rayleigh waves and the speed of sound in air are the same. Seismic vibrators usually operate above the ground surface, with vibrational energy transmitted into the subsurface through a baseplate resting on the ground surface. In such seismic surveys, it is common to make use of a vibrator mounted on a truck. Because the majority of the vibrator is exposed to the air, including the upper surface of the baseplate, some of the vibrational energy during operation is transmitted through the air as sound waves.

Such air-coupled sound waves are often of sufficient intensity to detrimentally affect the measurement of seismic signals of interest, specifically those seismic signals reflected from acoustic impedance boundaries in the subsurface. The reflected seismic signals are small in magnitude and waves propagating through the air may cause slight vibrations of seismic sensors (typically geophones or accelerometers) deployed proximate the ground surface, or vibrations of the ground itself. Such vibrations are typically of relatively high amplitude, and may result in such air-coupled waves being detected by the seismic sensors and recorded. Because air waves can cause the ground itself to vibrate, burial or shielding of the seismic sensors often times fails to adequately address the problem.

Airwave noise is strongest at higher frequencies, typically 30 Hz and above. The actual value of the frequency range at which air-wave coupled Rayleigh waves are more energetic depends on the elastic properties of formations proximate the Earth's surface.

Signal processing and hardware techniques have been used to attenuate the effects of airwaves on detected seismic signals. Signal processing techniques for removing Rayleigh waves (typically having a frequency less than 15 Hz.) have proven ineffective at the frequencies associated with airwaves because typical seismic sensor spacing results in spatial aliasing. Spatial aliasing of surface waves can be mitigated using point receiver acquisition, as contrasted with the typical practice of summing signals from subsets of the seismic sensors to attenuate the effects of near surface propagating seismic waves, but because of low propagation velocity of typical airwaves, the higher and more energetic frequencies thereof tend to remain spatially aliased.

It is desirable to have an improved method and apparatus for reducing the effects of airwaves on seismic signals detected from a vibrator-type seismic energy source.

SUMMARY

One aspect of the present disclosure is a seismic vibrator including a baseplate having a surface configured to couple to a ground surface. A driver is coupled to the baseplate and is configured to move the baseplate in a vibratory manner. A decoupling system is coupled to a part of the baseplate other than the ground-contacting surface. The decoupling system includes a first layer having a Young's modulus greater than that of a second layer coupled to the first layer. The second layer is coupled to the baseplate. The Young's moduli, thicknesses and masses of the first and second layer are selected to provide the decoupling system with a resonant frequency of at most, a spatial aliasing frequency of seismic sensors deployed on the ground surface or a lowest seismic frequency of interest.

A method for imparting seismic energy into the ground according to another aspect of the present disclosure includes driving a baseplate in contact with the ground in a vibratory manner. Motion of a part of the baseplate not in contact with the ground is coupled to a decoupling system comprising a first layer in contact with a second layer. The second layer is in contact with the part of the baseplate not in contact with the ground. A Young's modulus, thickness and mass of the first and second layers are selected so that the decoupling system has a resonant frequency of at most, a spatial aliasing frequency of seismic sensors deployed on the ground surface or a lowest seismic frequency of interest.

Other aspects and advantages will be apparent from the description and claims which follow.

DETAILED DESCRIPTION

Figure 1:
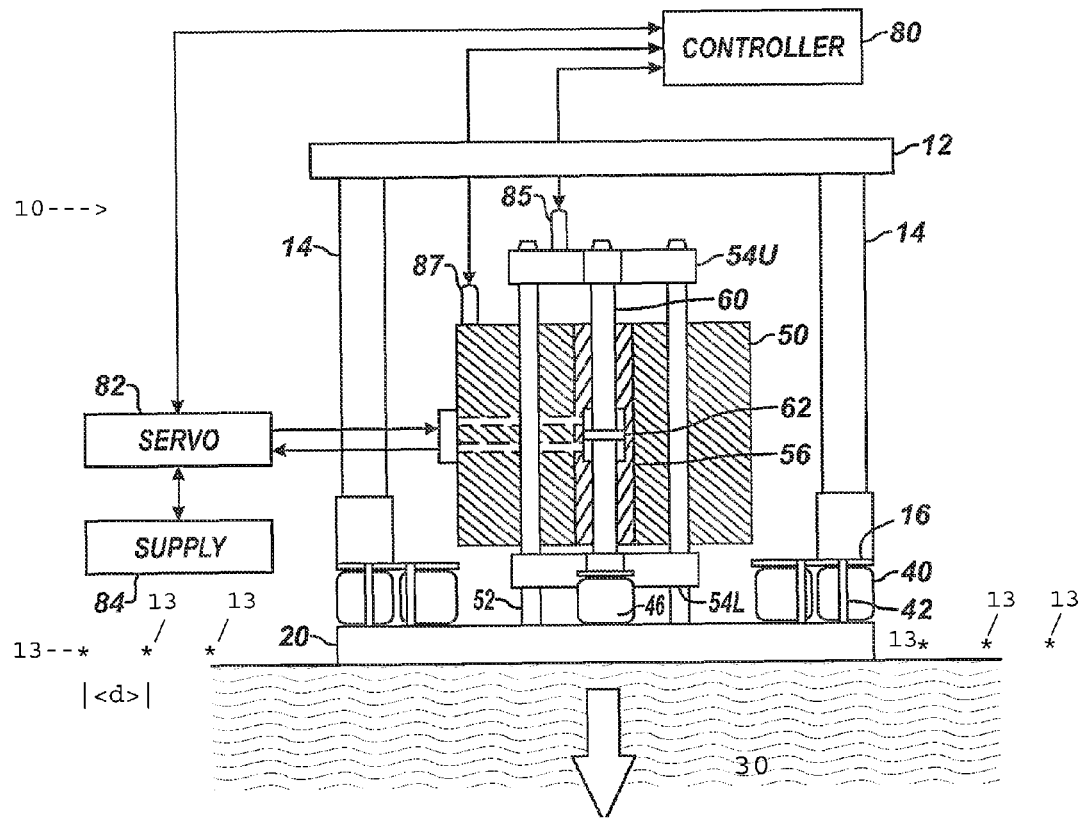
FIG. 1 shows an example seismic vibrator having a baseplate and decoupling system assembly.

A non-limiting example seismic vibrator is illustrated in FIG. 1 at 10. The vibrator structure shown in FIG. 1 is only one example of seismic vibrators that may be used with a baseplate and decoupling system assembly, the latter explained in more detail below. Therefore, the example vibrator shown in and explained with reference to FIG. 1 is not to be construed as limiting the scope of any present or subsequent claims related to the present application. The seismic vibrator 10 transmits force to the ground 30 using a base plate and decoupling system assembly 20 and a reaction mass 50. The vibrator 10 may be mounted on a carrier vehicle (not shown) that uses a mechanism and bars shown at 12 and 14 to lower the vibrator 10 to the ground. With the vibrator 10 lowered, the weight of the vehicle (not shown) can hold the baseplate and decoupling system assembly 20 engaged with the ground 30 so seismic source signals can be transmitted into the subsurface.

The baseplate and decoupling system assembly may be moved in a vibratory manner by a driver. The driver may include components according to the following non limiting example. The reaction mass 50 may be positioned directly above base plate and decoupling system assembly 20. Stilts 52 may extend from the base plate and decoupling system assembly 20 and through the reaction mass 50 to stabilize the stilts 52. Internally, the reaction mass 50 may have a cylinder 56 formed therein. A vertically extending piston 60 may extend through the cylinder 56, and a head 62 on the piston 60 divides the cylinder 56 into upper and lower chambers. The piston 60 may be connected at its lower end to a hub in a lower cross piece 54L and may extend upward through cylinder 56. The piston 60 upper end connects to a hub on an upper cross piece 54U, and the cross pieces 54U 54L may be connected to the stilts 52.

To isolate the baseplate and decoupling system assembly 20 from the bars 14, the bars 14 may have feet 16 with isolators 40 disposed between the feet 16 and the base plate and decoupling system assembly 20. As shown, two isolators 40 are disposed under each foot 16. In addition, the feet 16 may have tension members 42 interconnected between the edges of the feet 16 and the base plate 20. The tension members 42 are used to hold the base plate 20 when the vibrator 10 is raised and lowered to the ground. Finally, shock absorbers (not shown) may also be mounted between the bottom of the feet 16 and the base plate 20 to isolate vibrations therebetween.

During operation, a controller 80 may receive signals from a first sensor 85 coupled to the upper cross piece 54U and may receive signals from a second sensor 87 coupled to the reaction mass 50. Based on feedback from these sensors 85, 87 and a desired driver signal (usually a "sweep" or "chirp") for operating the vibrator 10, the controller 80 generates a drive signal to control a servo valve assembly 82. Driven by the drive signal, the servo valve assembly 82 alternatingly routes high pressure hydraulic fluid between a hydraulic fluid supply 84 and upper and lower cylinder piston chambers via ports in the reaction mass 50. As hydraulic fluid alternatingly accumulates in the piston 60 chambers located immediately above and below the piston head 62, the reaction mass 50 reciprocally vibrates in a vertical direction on the piston 60. In turn, the force generated by the vibrating reaction mass 50 may transfer to the base plate and decoupling system assembly 20 via the stilts 52 and the piston 60 so that the base plate and decoupling system assembly 20 vibrates at a desired amplitude and frequency or sweep to impart a seismic source signal into the ground 30. It will be appreciated by those skilled in the art that the motion of the driver may be coupled directly to the baseplate (23 in FIGS. 2 and 3), while motion of the baseplate may be coupled to one of two layers which form the decoupling system (25 in FIG. 2) for at least part of the baseplate not in contact with the ground surface 30.

As the moving reaction mass 50 acts upon the baseplate and decoupling system assembly 20 to impart a seismic source signal into the subsurface, the signal travels through the earth, reflects at discontinuities and formations, and then travels toward the Earth's surface. At the surface, an array of seismic sensors 13 coupled to the ground 30 detects the reflected signals, and a recording device (not shown) records the signals from the seismic sensors 13. The recording device (not shown) may use a correlation processor or other processor to correlate the computed ground force supplied by the seismic source to the seismic signals received by the seismic sensors. The vibrator 10 may have a hydraulic pump subsystem with hydraulic lines that carry hydraulic fluid to the servo valve assembly 80, and a cooler may be present to cool the hydraulic subsystem.

A local sensor (e.g., accelerometer or geophone) 85 may be positioned on the upper cross piece 54U of the vibrator 10, which may be positioned above the reaction mass 50. Affixed at a location 55 on the upper cross piece 54U, the local sensor 85 couples to the baseplate and decoupling system assembly 20 through the stilts 52.

In operation, the controller 80 may measure the signal imparted into the ground 30 using signals from the local sensor 85. The measured signals may be transmitted to a correlation processor or other processor (not shown), which may also receive the signals from the seismic sensors 13. The seismic sensors 13 may be separated by a distance shown at d in FIG. 1. The distance d is related to the spatial aliasing frequency of the airwave. Depending on the distance d, parameters for components of the baseplate and decoupling system assembly 20 may be selected as explained below.

Figure 2:
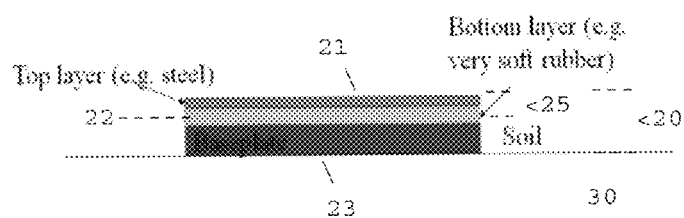
FIG. 2 shows an example seismic vibrator baseplate having a decoupling system associated therewith.

The baseplate and decoupling system assembly may include a two-layer decoupling system affixed to the upper surface of the baseplate. Referring to FIG. 2, the decoupling system 25 may be made from a first layer 21 of "stiff" material, for example, steel, or material having a similar value of Young's modulus as steel and a second layer 22 of "soft" material, for example, rubber or other elastomer coupled to an upper surface of the baseplate 23. The material used to make the second layer 22 may have a Young's modulus similar to that of rubber, and the Young's modulus thereof is generally low enough with respect to the Young's modulus of the first layer so that the stiffness of the first layer can be considered infinite and its viscosity zero. The materials used for the first layer 21 and the second layer 22 and their respective masses and thicknesses may be selected such that the decoupling system 25 has a resonance frequency lower than the dominant frequency at which airwaves generated by the baseplate 23 affect seismic signals detected by the seismic sensors (13 in FIG. 1). The dominant frequency may be selected as follows.

The materials and their thicknesses of the first 21 and second 22 layers may be chosen such that at least one of the two following conditions is met: (1) the decoupling system 25 has a resonance frequency close to as low as the minimum frequency used in seismic exploration (e.g., 4 Hz) to attenuate the airwave in the entire seismic frequency band of interest; or (2) the decoupling system 25 has a resonance frequency lower than the frequency at which the airwave is spatially aliased. In the latter case, the critical frequency range in which the airwave is spatially aliased will be suppressed. The lower frequency components of the airwave, which are generally properly spatially sampled, can be attenuated using techniques such as those used for the attenuation of ground surface propagating waves.

An advantage of designing the decoupling system 25 to meet condition 1 is that the airwave may be suppressed within the entire seismic frequency band. An advantage of designing the decoupling system 25 to meet condition 2 is that a thick first layer of stiff material, which may have substantial mass, is not required. The determination of the properties and thicknesses of the materials depicted in FIG. 2 can be obtained using the equivalent mechanical model depicted in FIG. 3. Because the decoupling system 25 is significantly lighter than the baseplate 23, the interaction between the baseplate 25 and the ground 30 can be ignored. If a stiff material such as steel is used for the first layer 21 and soft rubber is used for the second layer 22, the stiffness of the steel can be considered infinite and its viscosity zero. The remaining parameters of the mechanical model shown in FIG. 3 can be determined for the desired resonance frequency and damping factor.

Figure 3:
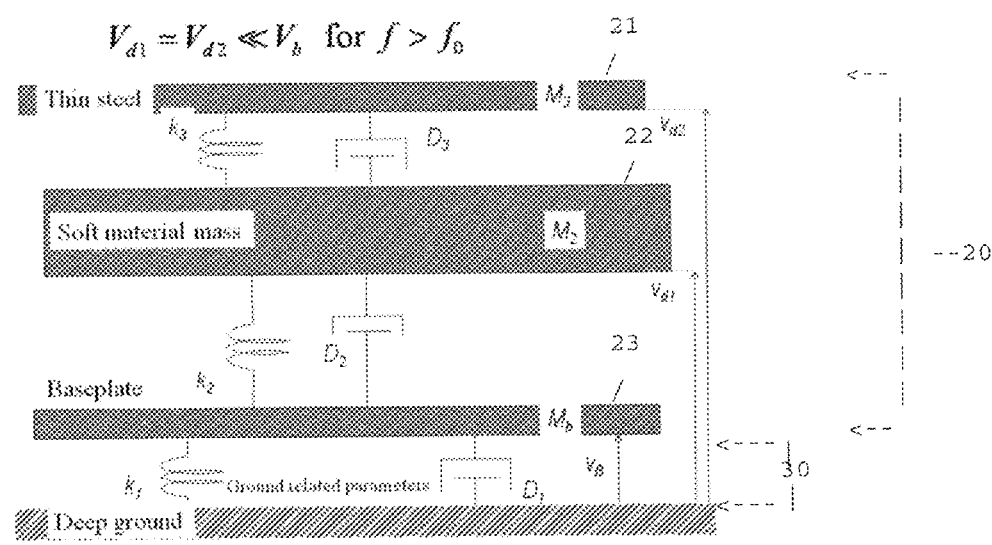
FIG. 3 shows an equivalent physical system to the vibrator baseplate and decoupling system.

Assuming $M_3 + M_2 = M_3$, $K_3 = \infty$, $D_3 = 0$, the equation of motion for the system shown in FIG. 3 can be written as:

$$M_3 \ddot{x}_{d1} = -D_2(\dot{x}_{d1} - \dot{x}_b) = M_3 g - k_2(x_{d1} - x_b l_0) + M_3 g \quad (1)$$

where $x_{d1}$ is the vertical location of the top of the second layer in an inertial system. Because the stiffness of the first layer is assumed to be infinite, then $x_{d1} = x_{d2} + \Delta_s$, wherein $\Delta_s$ is the thickness of the first layer. $l_0$ is the thickness of the second layer when the first layer is not applied to it. It is related to the stiffness of the second layer, $x_0$, when the first layer is added via the equilibrium equation:

$$M_3 g = k_2(l_0 - x_0) \quad (2)$$

Eq. (1) can be used to eliminate $l_0$ in eq. (1) to obtain:

$$M_3 \ddot{x}_{d1} = -D_2(\dot{x}_{d1}-\dot{x}_b) - k_2(x_{d1}-x_b+z_0) \quad (3)$$

Rewriting eq. (3) relative to the equilibrium position $x_0$, one obtains the following expression:

$$\ddot{x}_{d1} + 2\epsilon\dot{x}_{d1} + \omega_0^2 x_{d1} = \omega_0^2 x_b + 2\epsilon\dot{x}_b \quad (4)$$

that express in the time domain the relationship between the baseplate and the top of the second layer displacement. The resonance pulsation is $\omega_0 = \sqrt{k_2/M_3}$, the damping term is $2\epsilon = D_2/M_3$. Eq. (4) can be rewritten in the frequency domain as:

$$\frac{X_{d1}}{X_b} = \frac{1 + i2\frac{\omega}{\omega_0^2}\varepsilon}{1 - \left(\frac{\omega}{\omega_0}\right)^2 + i2\varepsilon\frac{\omega}{\omega_0^2}} \quad (5)$$

Examples of material properties and thicknesses to obtain resonant frequencies meeting at least one of the two conditions described above are listed in TABLE 1 and TABLE 2, respectively. In both cases shown here, the baseplate area is 2.7 m².

TABLE 1

Resonant Frequency at Bottom of Seismic Frequency Band

| First layer (Steel Plate) | | Second layer (Decoupler) | |
|---|---|---|---|
| Plate Thickness | 0.008 m | Stiffness per unit area | 50000 N/m³ |
| Steel Density | 7800 kg/m³ | Stiffness | 135000 N/m |
| Plate Mass | 168.48 kg | Thickness | 50 mm |

TABLE 2

Resonant Frequency at Spatial Aliasing Limit

| First layer (Steel Plate) | | Second layer (Decoupler) | |
|---|---|---|---|
| Plate Thickness | 0.004 m | Stiffness per unit area | 500000 N/m³ |
| Steel Density | 7800 kg/m³ | Stiffness | 1350000 N/m |
| Plate Mass | 84.24 kg | Thickness | 20 mm |

The resonance frequencies of the decoupling system example in TABLE 1 is 4.51 Hz and the resonance frequency of the decoupling system example in TABLE 2 is 20.15 Hz.

A seismic vibrator having a baseplate and decoupling system assembly may provide seismic data less affected by airwaves or that may be more easily processed to reduce the effect of airwaves therein.

While the present application has described aspects with respect to a limited number of embodiments, those skilled in the art, having benefit of this disclosure, will appreciate that other embodiments can be devised which do not depart from the scope of the present claims or any subsequent related claims in connection with this disclosure.

What is claimed is:

1. A seismic vibrator, comprising:
    a baseplate having a first surface configured to couple to a ground surface and a second surface distal to the first surface;
    a driver coupled to the baseplate and configured to move in a vibratory manner; and
    a decoupling system coupled to the second surface, the decoupling system comprising
        a first layer having a first Young's modulus, and
        a second layer having a second Young's modulus less than the first Young's modulus, wherein
    the second layer is disposed on the second surface of the baseplate, and
    the first layer is disposed on the second layer.

2. The seismic vibrator of claim 1 wherein the second layer comprises rubber.

3. The seismic vibrator of claim 1 wherein the first layer comprises steel.

4. The seismic vibrator of claim 1 wherein the first Young's modulus is sufficiently greater than the second Young's modulus such that the first Young's modulus may be approximated as infinite and a viscosity of the first layer may be approximated as zero.

5. The seismic vibrator of claim 1 wherein a resonant frequency of the decoupling system is at most a spatial aliasing frequency of seismic sensors deployed on the ground surface.

6. The seismic vibrator of claim 1 wherein a resonant frequency of the decoupling system is at most approximately 20 Hz.

7. The seismic vibrator of claim 1 wherein a resonant frequency of the decoupling system is at most a lowest seismic frequency.

8. The seismic vibrator of claim 7 wherein a resonant frequency of the decoupling system is at most approximately 4.5 Hz.

9. The seismic vibrator of claim 1 wherein the driver is configured to move the baseplate in a sweep of frequencies.

10. The seismic vibrator of claim 9 wherein the sweep of frequencies is within a seismic frequency band.

11. A method for imparting seismic energy into the ground, comprising:
    driving a baseplate in contact with the ground in a vibratory manner, the baseplate having a first surface in contact with the ground and a second surface distal to the first surface;
    coupling motion of a part of the second surface of the baseplate to a decoupling system, the decoupling system comprising
        a first layer having a first Young's modulus, and
        a second layer having a second Young's modulus less than the first Young's modulus, wherein
    the second layer is disposed on the second surface of the baseplate, and
    the first layer is disposed on the second layer.

12. The method of claim 11 wherein the first Young's modulus is sufficiently greater than the second Young's modulus such that the first Young's modulus may be approximated as infinite and a viscosity of the first layer may be approximated as zero.

13. The method of claim 11 wherein the second layer comprises rubber.

14. The method of claim 11 wherein the first layer comprises steel.

15. The method of claim 11 wherein a resonant frequency of the decoupling system is at most a spatial aliasing frequency of seismic sensors deployed on the ground surface.

16. The method of claim 15 wherein a resonant frequency of the decoupling system is at most approximately 20 Hz.

17. The method of claim 16 wherein a resonant frequency of the decoupling system is at most a lowest seismic frequency.

18. The method of claim 16 wherein a resonant frequency of the decoupling system is at most approximately 4.5 Hz.

19. The method of claim 11 wherein the vibratory manner comprises moving the vibrator through a sweep of vibration frequencies.

20. The seismic vibrator of claim 1 wherein the first and second Young's moduli, thicknesses and masses of the first and second layer are selected to provide the decoupling system with a resonant frequency of at most, a spatial aliasing frequency of seismic sensors deployed on the ground surface.

21. The seismic vibrator of claim 1 further comprising
a support that couples the driver to the decoupling system, wherein
the support extends in a first direction,
the driver is configured to move a reaction mass in the first direction,
and the second layer is disposed between the baseplate and the first layer in the first direction in a region where the support is in contact with the first layer of the decoupling system.

* * * * *